(12) United States Patent
Altman

(10) Patent No.: US 9,369,921 B2
(45) Date of Patent: Jun. 14, 2016

(54) NETWORK ASSISTED BONDING

(71) Applicant: Baruch Yosef Altman, Pardes Hana (IL)

(72) Inventor: Baruch Yosef Altman, Pardes Hana (IL)

(73) Assignee: LiveU Ltd., Kfar Saba (IL)

( * ) Notice: Subject to any disclaimer, the term of this patent is extended or adjusted under 35 U.S.C. 154(b) by 91 days.

(21) Appl. No.: 14/292,234

(22) Filed: May 30, 2014

(65) Prior Publication Data

US 2014/0355446 A1     Dec. 4, 2014

Related U.S. Application Data

(60) Provisional application No. 61/829,389, filed on May 31, 2013.

(51) Int. Cl.
*H04W 28/08* (2009.01)
*H04W 28/02* (2009.01)

(52) U.S. Cl.
CPC .......... *H04W 28/08* (2013.01); *H04W 28/0289* (2013.01)

(58) Field of Classification Search
None
See application file for complete search history.

(56) References Cited

U.S. PATENT DOCUMENTS

| | | | |
|---|---|---|---|
| 5,280,470 A | 1/1994 | Buhrke et al. | |
| 5,699,413 A | 12/1997 | Sridhar | |
| 5,771,229 A | 6/1998 | Gavrilovich | |
| 6,154,637 A | 11/2000 | Wright et al. | |
| 6,253,247 B1 | 6/2001 | Bhaskar et al. | |
| 6,288,753 B1 | 9/2001 | DeNicola et al. | |
| 6,496,477 B1 | 12/2002 | Perkins et al. | |
| 6,510,553 B1 | 1/2003 | Hazra | |
| 6,647,015 B2 | 11/2003 | Malkemes et al. | |
| 6,683,877 B1 | 1/2004 | Gibbs et al. | |
| 6,754,872 B2 | 6/2004 | Zhang et al. | |
| 6,757,256 B1 | 6/2004 | Anandakumar et al. | |

(Continued)

FOREIGN PATENT DOCUMENTS

| | | |
|---|---|---|
| EP | 1 863 304 A1 | 12/2007 |
| EP | 2 824 945 | 1/2015 |

(Continued)

OTHER PUBLICATIONS

International Application PCT/IB2013/053843 Search Report dated Aug. 21, 2013.

(Continued)

*Primary Examiner* — Benjamin H Elliott, IV
(74) *Attorney, Agent, or Firm* — Finnegan, Henderson, Farabow, Garrett & Dunner, L.L.P.

(57) ABSTRACT

A device is provided for facilitating a media transmission over a wireless network. The device may control and manage a plurality of first wireless modems on a first end node side. The plurality of first wireless modems may be configured to transmit/receive a plurality of data streams over a plurality of wireless data channels to/from at least one second wireless modem on a second end node side. The device may receive network-related information from a network component associated with the wireless network. The network-related information may be used to adjust the distribution or receipt of the plurality of data streams between the plurality of first wireless modems, thereby enabling reconstitution of the media transmission from the plurality of data streams. In addition, the device may be configured to send performance-related information to the network component, thereby enabling a determination to be made about managing network resources of the wireless network.

32 Claims, 7 Drawing Sheets

(56) References Cited

U.S. PATENT DOCUMENTS

| | | |
|---|---|---|
| 6,774,926 B1 | 8/2004 | Ellis et al. |
| 6,785,330 B1 | 8/2004 | Whealton et al. |
| 6,788,686 B1 | 9/2004 | Khotimsky et al. |
| 6,831,574 B1 | 12/2004 | Mills et al. |
| 6,842,446 B2 | 1/2005 | Everson et al. |
| 6,904,049 B1 | 6/2005 | Maeda |
| 6,963,279 B1 | 11/2005 | Martinelli et al. |
| 6,987,732 B2 | 1/2006 | Gracon et al. |
| 6,999,432 B2 | 2/2006 | Zhang et al. |
| 7,013,354 B1 | 3/2006 | Beck et al. |
| 7,027,415 B1 | 4/2006 | Dahlby et al. |
| 7,039,930 B1 | 5/2006 | Goodman et al. |
| 7,082,221 B1 | 7/2006 | Jiang |
| 7,151,762 B1 | 12/2006 | Ho et al. |
| 7,237,032 B2 | 6/2007 | Gemmell |
| 7,237,033 B2 | 6/2007 | Weigand et al. |
| 7,292,571 B2 | 11/2007 | Brown |
| 7,317,750 B2 | 1/2008 | Shattil |
| 7,324,491 B1 | 1/2008 | Benveniste et al. |
| 7,340,764 B2 | 3/2008 | Kubota et al. |
| 7,542,456 B2 | 6/2009 | Garg et al. |
| 7,551,671 B2 | 6/2009 | Tyldesley et al. |
| 7,738,391 B2 | 6/2010 | Melpignano et al. |
| 7,894,807 B1 | 2/2011 | Drennan |
| 7,948,933 B2 | 5/2011 | Ohayon et al. |
| 8,165,044 B2 | 4/2012 | Mahajan |
| 8,204,085 B1 | 6/2012 | Courtney et al. |
| 8,467,337 B1 | 6/2013 | Ohayon et al. |
| 8,488,659 B2 | 7/2013 | Ohayon et al. |
| 8,649,402 B2 | 2/2014 | Ohayon et al. |
| 8,737,436 B2 | 5/2014 | Ohayon et al. |
| 8,787,966 B2 | 7/2014 | Altman et al. |
| 8,942,179 B2 | 1/2015 | Ohayon et al. |
| 8,964,646 B2 | 2/2015 | Ohayon et al. |
| 2002/0040479 A1 | 4/2002 | Ehrman et al. |
| 2002/0054578 A1 | 5/2002 | Zhang et al. |
| 2002/0071393 A1 | 6/2002 | Musoll |
| 2002/0143565 A1 | 10/2002 | Headings et al. |
| 2002/0146232 A1 | 10/2002 | Harradine et al. |
| 2002/0154703 A1 | 10/2002 | Kubota et al. |
| 2002/0174434 A1 | 11/2002 | Lee et al. |
| 2002/0176482 A1 | 11/2002 | Chien |
| 2003/0002577 A1 | 1/2003 | Pinder |
| 2003/0009717 A1 | 1/2003 | Fukushima et al. |
| 2003/0016770 A1 | 1/2003 | Trans et al. |
| 2003/0046708 A1 | 3/2003 | Jutzi |
| 2003/0051041 A1 | 3/2003 | Kalavade et al. |
| 2003/0055971 A1 | 3/2003 | Menon |
| 2003/0061503 A1 | 3/2003 | Katz et al. |
| 2003/0074554 A1 | 4/2003 | Roach et al. |
| 2003/0146940 A1 | 8/2003 | Ellis et al. |
| 2003/0159143 A1 | 8/2003 | Chan |
| 2003/0174733 A1* | 9/2003 | Kawai .............. H04L 45/00 370/498 |
| 2004/0013192 A1 | 1/2004 | Kennedy |
| 2004/0023652 A1 | 2/2004 | Shah et al. |
| 2004/0025186 A1 | 2/2004 | Jennings et al. |
| 2004/0098748 A1 | 5/2004 | Bo et al. |
| 2004/0133907 A1 | 7/2004 | Rodriguez et al. |
| 2004/0133917 A1 | 7/2004 | Schilling |
| 2004/0135879 A1 | 7/2004 | Stacy et al. |
| 2004/0177155 A1 | 9/2004 | Enokida et al. |
| 2004/0180696 A1 | 9/2004 | Foore et al. |
| 2005/0034155 A1 | 2/2005 | Gordon et al. |
| 2005/0035368 A1 | 2/2005 | Bunyk |
| 2005/0041586 A1 | 2/2005 | Jiang |
| 2005/0047363 A1 | 3/2005 | Jiang |
| 2005/0105815 A1 | 5/2005 | Zhang et al. |
| 2005/0122914 A1 | 6/2005 | Durso et al. |
| 2005/0125670 A1 | 6/2005 | Sozzani et al. |
| 2005/0163093 A1 | 7/2005 | Garg et al. |
| 2005/0183109 A1 | 8/2005 | Basson et al. |
| 2005/0265383 A1 | 12/2005 | Melpignano et al. |
| 2006/0015917 A1 | 1/2006 | Rozental |
| 2006/0015924 A1 | 1/2006 | Kortum et al. |
| 2006/0062242 A1 | 3/2006 | Dacosta |
| 2006/0062243 A1 | 3/2006 | Dacosta |
| 2006/0085551 A1 | 4/2006 | Xie et al. |
| 2006/0088092 A1 | 4/2006 | Chen et al. |
| 2006/0146831 A1 | 7/2006 | Argyropoulos et al. |
| 2006/0221846 A1 | 10/2006 | Dyck et al. |
| 2006/0264184 A1 | 11/2006 | Li et al. |
| 2006/0274773 A1 | 12/2006 | Cohen et al. |
| 2007/0064949 A1 | 3/2007 | Choi et al. |
| 2007/0083899 A1 | 4/2007 | Compton et al. |
| 2007/0098007 A1 | 5/2007 | Prodan et al. |
| 2007/0121678 A1 | 5/2007 | Brooks et al. |
| 2007/0136777 A1 | 6/2007 | Hasek et al. |
| 2007/0140455 A1 | 6/2007 | Zhao |
| 2007/0204321 A1 | 8/2007 | Shen et al. |
| 2007/0207832 A1 | 9/2007 | Gerardi et al. |
| 2007/0230475 A1 | 10/2007 | Langner |
| 2007/0247515 A1 | 10/2007 | Roman |
| 2007/0263072 A1 | 11/2007 | Lochbaum et al. |
| 2007/0268876 A1 | 11/2007 | Yellin et al. |
| 2008/0025210 A1 | 1/2008 | Honary et al. |
| 2008/0034396 A1 | 2/2008 | Lev |
| 2008/0049723 A1 | 2/2008 | Bill et al. |
| 2008/0120676 A1 | 5/2008 | Morad et al. |
| 2008/0295159 A1 | 11/2008 | Sentinelli |
| 2008/0310371 A1 | 12/2008 | Russell |
| 2009/0006848 A1 | 1/2009 | Adrangi et al. |
| 2009/0138925 A1 | 5/2009 | Headings et al. |
| 2009/0163175 A1 | 6/2009 | Shi et al. |
| 2009/0168701 A1* | 7/2009 | White .............. H04L 12/5692 370/328 |
| 2009/0249421 A1* | 10/2009 | Liu .............. H04L 12/2801 725/116 |
| 2009/0270129 A1 | 10/2009 | Kuo et al. |
| 2010/0045791 A1 | 2/2010 | Drive et al. |
| 2010/0103820 A1* | 4/2010 | Fuller .............. H04L 12/5695 370/236 |
| 2010/0210304 A1 | 8/2010 | Huslak |
| 2010/0227588 A1 | 9/2010 | Bradley |
| 2010/0248690 A1 | 9/2010 | Biggs et al. |
| 2010/0273424 A1 | 10/2010 | De Petris et al. |
| 2010/0311391 A1 | 12/2010 | Siu et al. |
| 2010/0311402 A1 | 12/2010 | Srinivasan et al. |
| 2010/0311468 A1 | 12/2010 | Shi et al. |
| 2010/0322259 A1 | 12/2010 | Garg et al. |
| 2011/0007693 A1 | 1/2011 | Frusina et al. |
| 2011/0028135 A1 | 2/2011 | Srinivasan |
| 2011/0051642 A1 | 3/2011 | Krishnaswamy |
| 2011/0059773 A1 | 3/2011 | Neumann et al. |
| 2011/0081951 A1 | 4/2011 | Hwang |
| 2011/0115976 A1* | 5/2011 | Ohayon .............. H04N 21/2187 348/425.2 |
| 2011/0117909 A1 | 5/2011 | Cao et al. |
| 2011/0151858 A1 | 6/2011 | Lai |
| 2011/0154460 A1 | 6/2011 | Khare et al. |
| 2011/0206013 A1* | 8/2011 | Aramoto .............. H04W 36/26 370/332 |
| 2011/0269456 A1 | 11/2011 | Krishnaswamy et al. |
| 2012/0021744 A1 | 1/2012 | Chin et al. |
| 2012/0055231 A1 | 3/2012 | Odendall |
| 2012/0082146 A1* | 4/2012 | Andreasen .......... H04L 12/4633 370/338 |
| 2012/0135715 A1 | 5/2012 | Kang et al. |
| 2012/0195259 A1 | 8/2012 | Ohayon et al. |
| 2012/0219085 A1 | 8/2012 | Long et al. |
| 2013/0029720 A1 | 1/2013 | Clevorn |
| 2013/0094522 A1 | 4/2013 | Moshfeghi |
| 2013/0142095 A1* | 6/2013 | Calcev .............. H04W 52/0219 370/311 |
| 2013/0155231 A1 | 6/2013 | Ohayon et al. |
| 2013/0329639 A1 | 12/2013 | Wietfeldt et al. |
| 2014/0082697 A1* | 3/2014 | Watfa .................. H04W 76/025 726/3 |
| 2014/0355446 A1* | 12/2014 | Altman .................. H04W 28/08 370/235 |
| 2015/0124752 A1 | 5/2015 | Ohayon et al. |

(56) References Cited

U.S. PATENT DOCUMENTS

FOREIGN PATENT DOCUMENTS

| GB | 2428529 | 1/2007 |
|---|---|---|
| JP | 2002-010332 | 1/2002 |
| JP | 2002-344965 | 11/2002 |
| JP | 2003-152787 | 5/2003 |
| JP | 2005-065207 | 3/2005 |
| JP | 2014-030235 | 2/2014 |
| WO | WO-02-063501 | 8/2002 |
| WO | WO-02-089519 | 11/2002 |
| WO | WO-03-098850 | 11/2003 |
| WO | WO-2005-060300 | 6/2005 |
| WO | WO-2005-109789 | 11/2005 |
| WO | WO-2009-093252 | 7/2009 |
| WO | WO-2011-075739 | 6/2011 |
| WO | WO-2011-101709 | 8/2011 |
| WO | WO-2012-158850 | 11/2012 |
| WO | WO-2013-171648 | 11/2013 |
| WO | WO-2013-186663 | 12/2013 |

OTHER PUBLICATIONS

International Application PCT/IB2013/054551 Search Report dated Oct. 14, 2013.
Cisco Systems Inc., "Multilink PPP for DDR—Basic Configuration and Verification," Document ID: 10239, Sep. 9, 2005 (9 pp.).
Conant, G.E., "Multilink PPP: One Big Virtual WAN Pipe," Published on Linux Journal (http:/www.linuxjournal.com), Sep. 1, 1999 (6 pp.).
Dejero, "Dejero Transforms Live Newsgathering," Jun. 7, 2010 (6 pp.).
European Patent Application No. 09704224.6 Official Action dated Nov. 17, 2011.
European Patent Application No. 12196907.5 Search Report dated Apr. 3, 2013.
European Patent Application No. 09704224.6 Office Action dated Feb. 3, 2014.
European Patent Application No. 137292421 Search Report dated Apr. 13, 2015.
European Patent Application No. 09704224.6 Official Action dated May 8, 2015.
JP Application No. 2013-191799 Office Action dated Apr. 30, 2014.
PCWorld, "Do Web Accelerators Work," Jan. 27, 1999 (4 pp.).
Sklower et al., The PPP Multilink Protocol (MP), RFC 1990, Network Working Group, Aug. 1996 (22 pp.).
Smith, K., "Ascend's Multilink Protocol Plus (MP+)," RFC 1934, Network Working Group, Apr. 1996 (48 pp.).
TVU Networks, "Sharp, glitch-free picture quality from a compact video news gathering backpack," May 6, 2011 (4 pp.).
U.S. Appl. No. 12/965,879 Office Action dated Aug. 29, 2013.
U.S. Appl. No. 13/368,369 Office Action dated Aug. 29, 2013.
U.S. Appl. No. 13/713,001 Office Action dated Apr. 29, 2015.
U.S. Appl. No. 13/886,050 Office Action dated Aug. 12, 2013.
U.S. Appl. No. 13/921,227 Office Action dated Sep. 30, 2013.
U.S. Appl. No. 13/921,227 Office Action dated Feb. 21, 2014.
U.S. Appl. No. 14/588,939 Office Action dated Jul. 16, 2015.

* cited by examiner

NETWORK ASSISTED BONDING

CROSS REFERENCE TO RELATED APPLICATIONS

This application claims priority under 35 U.S.C. §119 to U.S. Provisional Patent Application No. 61/829,389, filed on May 31, 2013, which is expressly incorporated herein by reference in its entirety.

TECHNICAL FIELD

This disclosure generally relates to devices and methods for facilitating a media transmission stream. More particularly, this disclosure relates to devices and methods for transmitting and receiving the media transmission stream via a plurality of parallel data channels.

BACKGROUND

A bonding device is a device that uses multiple modems to carry a single data stream. Some bonding devices can split a single data stream and transmit a plurality of data streams via a plurality of paths in the uplink. For example, a bonding device may transmit media stream (video and audio) gathered by a camera at live events, such as breaking news events, sports, entertainment, social events, etc., to a receiving server that reassembles the data streams. Examples of such bonding devices are described in U.S. Pat. No. 7,948,933, and in PCT Patent Application No. WO 2013/171648, both of which are incorporated herein by reference in their entirety.

Bonding devices may also be used to receive a plurality of data streams from a plurality of paths in the downlink and reassemble them. For example, a bonding device such as a smartphone or tablet may be used for receiving a stream of media (e.g., a live stream or a downloaded video). When downloading media using multiple wireless connections the end-user device may have better availability than if using a single wireless connection. In some cases the bonding devices may use more than one communications network to carry the single data stream. For example, bonding devices may use multiple modems in one or more cellular networks, WiFi networks, and/or satellite networks. The present disclosure describes how both the bonding devices and the communication networks may benefit from the exchange of information used for managing the transmission resources.

SUMMARY

Some embodiments of the disclosure include a method and a communications device configured to facilitate a media transmission over at least one wireless communications network. The communications device may include at least one processor configured to control a plurality of first wireless modems associated with a first end node side of the at least one wireless communications network, and to communicate via a plurality of parallel wireless data channels with at least one second wireless modem associated with a second end node side of the at least one wireless communications network. The at least one processor can manage at least one of distribution and receipt of a plurality of data streams split over the plurality of parallel wireless data channels, wherein the media transmission comprises an aggregate of the plurality of data streams. In addition, upon receiving network-related information from a network component associated with, or informative about, the at least one wireless communications network, the at least one processor can use the received network-related information to adjust at least one of distribution and receipt of the plurality of data streams between the plurality of first wireless modems, thereby enabling reconstitution of the media transmission from the plurality of data streams. Using the network-related information may enable media transmission in a more efficient way, allowing more effective QoS, lowering costs, conserving network resources (such as power and bandwidth), and improving overall resource utilization, including by other users of the network or networks.

Other embodiments of the disclosure include a method and a communications device configured to assist managing at least one wireless communications network. The communications device may include at least one processor configured to control a plurality of first wireless modems associated with a first end node side of the at least one wireless communications network, and to communicate via a plurality of parallel wireless data channels with at least one second wireless modem associated with a second end node side of the at least one wireless communications network. The at least one processor can manage at least one of distribution and receipt of a plurality of data streams over the plurality of parallel data channels, wherein the media transmission comprises an aggregate of the plurality of data streams. In addition, the at least one processor can cause performance-related information to be sent to a network component located intermediate (the first end node and the second end node, and from the first end node and the second end node. By doing so, the communications device enables a decision and determination to be made about managing network resources of the at least one wireless communications network, wherein the determination is based on the performance-related information.

Additional embodiments of the disclosure include a method and a network device configured to facilitate a media transmission over at least one wireless communications network. The network device may include a network component located intermediate a first end node on a media transmission side of the at least one wireless communications network and a second end node on a media reception side of the at least one wireless communications network. In some cases the media transmission side includes a plurality of first wireless modems and the media reception side includes at least one second wireless modem. As a result, the at least one wireless communications network includes a plurality of parallel wireless data channels extending between and connecting the plurality of first wireless modems with the at least one second wireless modem. The network component may include at least one processor configured to retrieve network-related information from the at least one wireless communications network and transmit the network-related information to the media transmission side, in order to cause a redistribution of a plurality of data streams handled by at least some of the plurality of first wireless modems.

Other aspects of the disclosure are set forth in the description which follows and are included in the appended claims, the entirety of which is incorporated into this Summary by reference.

BRIEF DESCRIPTION OF THE DRAWINGS

For a more complete understanding of the disclosure, reference is now made to the following detailed description taken in conjunction with the accompanying drawings wherein.

DETAILED DESCRIPTION

Figure 1:
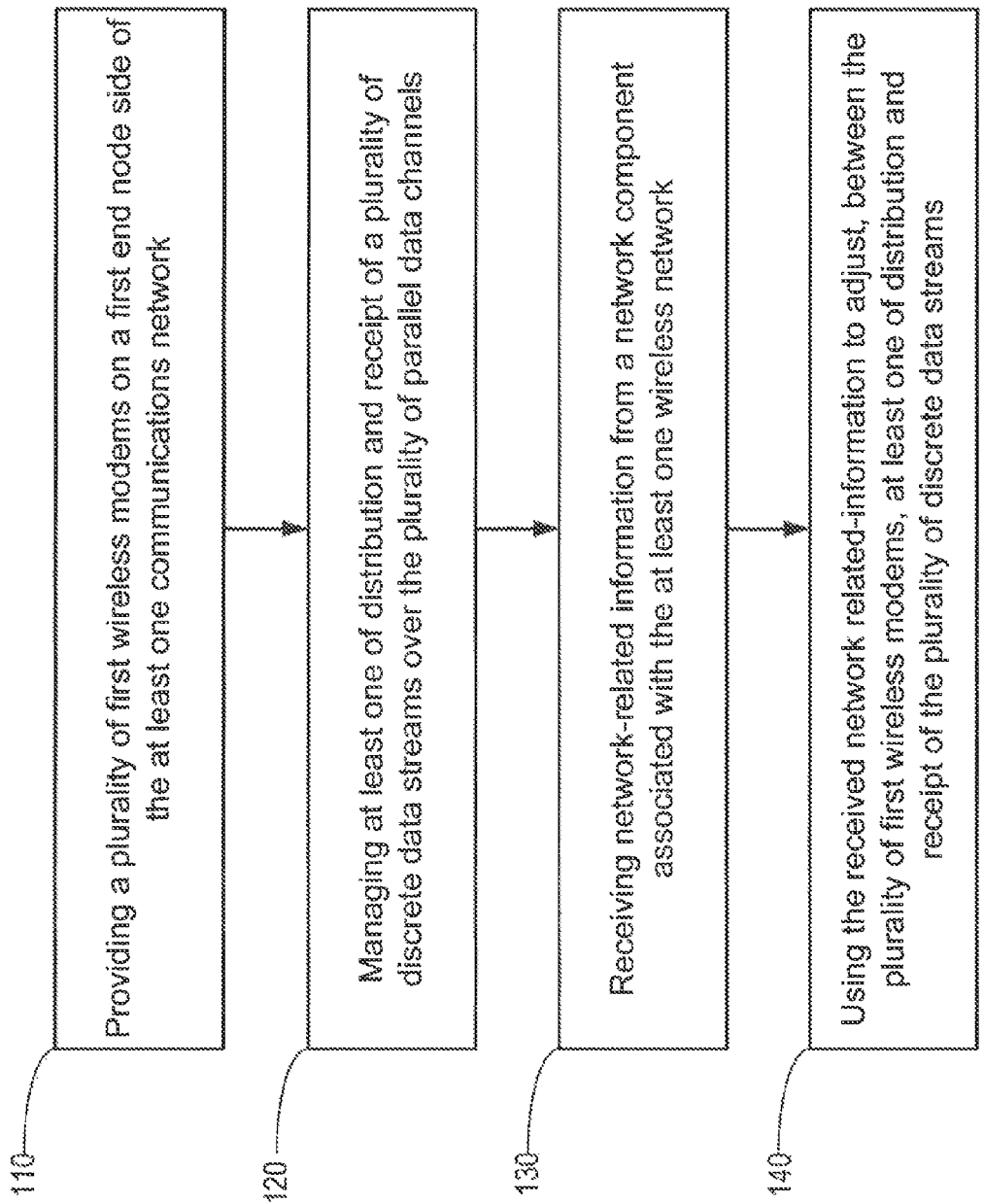
FIG. 1 is flow chart presenting an overview of an exemplary method according to some embodiments of the present disclosure.

The following detailed description refers to the accompanying drawings. Wherever possible, the same reference numbers are used in the drawings and the following description to refer to the same or similar elements. While several illustrative embodiments are described herein, modifications, adaptations and other implementations are possible. The specific details in the described embodiments and exemplary apparatuses are set forth in order to provide a thorough understanding of the embodiments and the exemplary apparatuses. It should be apparent, however, that not all details are required in all embodiments of the invention. Accordingly, the following detailed description is not limited to the disclosed embodiments and examples. Instead, the proper scope is defined by the appended claims.

Disclosed embodiments may provide several communications devices, for example, a bonding device that can transmit (or receive) a single data stream via a plurality of wireless data channels over at least one wireless network whereas the stream is split over the connections and reassembled into a single coherent data stream at the receiving side. The bonding device may receive network-related information from the at least one wireless network, and use the received network-related information to adjust the transmission (or receipt) of parts of the single data stream between multiple connections. The network-related information may help the bonding device to use the connections in an efficient manner, such as by not transmitting over connections associated with a network where a handover is expected to be performed. In addition, reducing the load of some connections may reduce lost packets and retransmissions in the case of some network-reported interference, congestion, degradation, or other problem.

FIG. 1 is flow chart illustrating an overview of the exemplary method for facilitating a media transmission over at least one communications network, according to some embodiments of the disclosure. In step 110, a plurality of first wireless modems are provided on a first end node side of the at least one communications network. The plurality of first wireless modems may communicate via a plurality of parallel wireless data channels with at least one second wireless modem associated with a second end node side of the at least one communications network. Step 120 includes managing at least one of distribution and receipt of a plurality of discrete data streams over the plurality of parallel data channels. The media transmission, which may be transmitted or received by the bonding device, may comprise an aggregate, or bonding, of the plurality of discrete data streams. In step 130, network-related information is received from a network component associated with the at least one wireless network. In step 140, the received network-related information is used to adjust, between the plurality of first wireless modems, the distribution or receipt of the plurality of discrete data streams, thereby enabling reconstitution of the media transmission from the plurality of discrete data streams.

Figure 2:
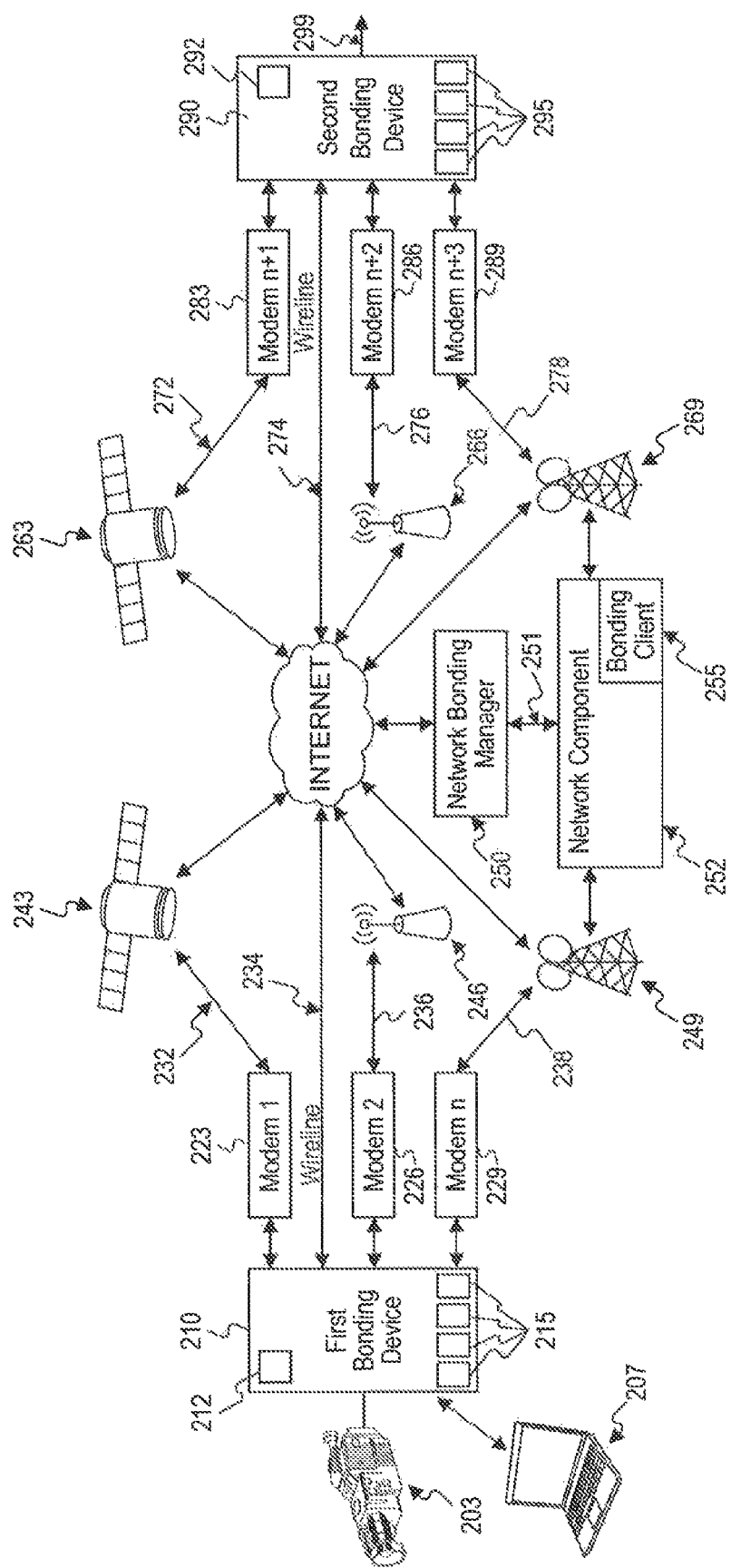
FIG. 2 is a schematic illustration of the communication paths between two bonding devices according to a first embodiment of the present disclosure.

FIG. 2 is a schematic illustration of the communication paths between a first bonding device 210 and a second bonding device 290, consistent with disclosed embodiments. Although FIG. 2 is symmetrical with regard to the communication paths between first bonding device 210 and second bonding device 290, the "symmetrical" elements should not be misinterpreted as mandatory. For example, first bonding device 210 may be using ten modems of networks A, B and C; whereas, second bonding device 290 may be using only two modems of networks A and X.

As discussed above, a bonding device is a device that uses multiple modems to carry a single data stream. The term "bonding device" also referred to herein as "end-user" or as "end node," includes a device with transmitting capabilities, receiving capabilities, or both. A bonding device may be a dedicated bonding device or a general purpose device running a bonding software (e.g., a smartphone, a tablet, a cellular modem or terminal, a WiFi modem or terminal, a satellite modem or terminal, an MW modem or terminal, a COFDM modem or terminal, a Mifi-sort of device, a chipset running cellular protocols, a computer, a communication device, etc.). In some examples the bonding device may be a live media transmitter (e.g., first bonding device 210) configured to simultaneously use multiple modems to broadcast a live media stream. In other examples the bonding device may be a media receiver (e.g., second bonding device 290) configured to simultaneously receive from multiple wireless modems a plurality of data packets and reassemble them to a single coherent media stream.

In some cases, the bonding device may use the multiple modems to simultaneously deliver the media stream. However, the transmission of the media stream may be non-simultaneous or near-simultaneous, because the exact moment that the media stream is relayed (transmitted or received) is not under the bonding software layer control. The exact timing of transmission is controlled by the actual modems and their associated networks. Therefore, the term "simultaneously" indicates that multiple parallel data channels are open for relaying data via different modems at the same time. not that the different modems are necessarily transmitting data at the same time. The actual data transmission may or may not occur at precisely the same time via the different modems.

For the sake of simplicity, the example discussed below assumes that first bonding device 210 transmits a media stream via a plurality of parallel wireless data channels to second bonding device 290. In addition or alternatively, first bonding device 210 may receive data streams from second bonding device 290.

In this example, first bonding device 210 may be a dedicated transmitting unit retrieving from a video camera or external encoder a raw data stream. Second bonding device 290 may be a server belonging to a broadcast company, which reassembles the received separated data streams and outputs a coherent data stream 299 to be distributed to viewers. The term "raw data stream" refers to any data stream that can be split and delivered via a plurality of parallel wireless data channels. The term "coherent data stream" refers to a group of data packets that together can be comprehended or that resemble the raw data stream before its split. For example, a data stream may be "coherent" if the data was transmitted in the plurality of data streams and then reassembled in a manner it can be comprehended and consumed by non-bonding devices or software awaiting it. In the case of media transmission, the result of this assembly or reconstruction is a coherent media stream (in this example, video and audio) that can be viewed, processed, or otherwise manipulated.

The bonding device can manage the distribution (or receipt) of a plurality of data streams. The term "plurality of data streams" as used herein refers to a plurality of substreams that together make up at least a part of a larger data stream. On the transmitting side, the plurality of data streams may include multiple data packets created from a raw data stream by a bonding device or bonding software. The plurality of data streams may be created discrete from each other and in correlation to the current availability of the plurality of connections or modems or networks associated with the bonding device. On the destination side, the plurality of data streams may be received (in part or in full), and then processed to create coherent media stream 299. The first bonding device 110 can manage the distribution of a plurality of discrete data streams over the plurality of parallel wireless data channels to transmit substantially any sort of data. The large bandwidth afforded by bonding multiple channels is particularly useful in high-speed media streaming.

For example, first bonding device 210 can split any raw data stream (e.g., a media stream) to a plurality of discrete data streams or packet streams that can be encapsulated according to any IP protocol. For example, the IP protocol may be IPV4, IPV6, a future version, or any mix of them. The encapsulated plurality of data streams may be transmitted over the Internet to second bonding device 290. Second bonding device 290 may manage the receipt of the plurality of discrete data streams to enable assembly of the media stream, and request retransmissions of missed or erroneously received packets. Although the Internet is shown in FIG. 2 as a single entity, in practice the network associated with the Internet typically includes components of multiple interconnected networks.

In some embodiments, first bonding device 210 may receive a raw media stream from a computing device 207 (e.g., laptop, tablet, smartphone, desktop computer or router, etc.) over wireless connection, such as, WiFi, Bluetooth, Wireless USB, Wireless High-Definition Multimedia Interface (WHDMI), Coded Orthogonal Frequency Division Multiplexing (COFDM). Alternatively, first bonding device 210 may receive the raw media stream from a capturing device 203 (e.g., video camera) over a wired connection, such as HDMI connection, serial digital interface (SDI) connection, a standard camera connection, a USB connection, a proprietary connection, an Ethernet connection. In addition, first bonding device 210 may acquire the media stream from one or more sources (e.g., capturing device 203 and/or computing device 207).

In some embodiments, second bonding device 290 may be associated with a virtual bonding receiver that can be co-located next to various network devices (not shown in the figure). For example, the virtual bonding receiver may reside next to or within a base station. Second bonding device 290 (or the virtual bonding receiver) may receive and analyze the data streams originating from modems associated with first bonding device 210. Second bonding device 290 (or the virtual bonding receiver) may take real-time application-level measurements for use in improving or optimizing performance. Such optimization may include optimization of the bandwidth and/or other output characteristics of the video encoder feeding first bonding device 210. For example, if a downlink bonded transmission is performed and second bonding device 210 detects that one of the modems associated with first bonding device 210 has a high error rate, second bonding device 210 may report it to first bonding device 210, which may decide to change the distribution of the substreams accordingly.

The bonding device (e.g., first bonding device 210 or second bonding device 290) may be implemented as a single unit that integrates all or some of the modems that it uses. Additionally or alternatively, the bonding device may be connected to any number of modems externally, via wires or wirelessly. As used herein, the term "modem" includes any device capable of transmitting signals (e.g., a transmitter), receiving signals (e.g., a receiver), or both (e.g., a transceiver). A modem may handle at least the communication at the $1^{st}$ layer (e.g., PHY) and at the $2^{nd}$ layer (e.g., MAC, RLC). The bonding device may control different types of modems, for example, a cellular modem, a cellular USB "dongle," a satellite terminal, a satellite phone, a cellular smartphone, a cellular tablet, a MiFi Access Point, a Software Defined Radio (SDR) device, a COFDM transceiver, a WiFi module, a cable modem, a proprietary modem, and a processor implementing any of the above. While this disclosure is not limited to any particular modem or communications protocol, embodiments of the disclosure may employ a modem that uses one or more of the following exemplary communication standards: GSM, GPRS, HSPA, Edge, LTE, LTE Advanced, HSPA, CDMA, CDMA Rev A, CDMA Rev B, Wimax, WiFi, Bluetooth, COFDM, Wibro, Satellite BGAN, and satellite VSAT. In addition, embodiments of the disclosure may employ modems that use other known or future wireless protocols.

In some embodiments the bonding device includes at least one processor. In the embodiment of FIG. 2, for example, first bonding device 210 includes processor 212, and second bonding device 290 includes processor 292. The term "processor" as used herein refers to any physical device having an electric circuit that performs a logic operation on an input or inputs. For example, each of processors 212 and 292 may include one or more integrated circuits, microchips, microcontrollers, microprocessors, all or part of a central processing unit (CPU), graphics processing unit (GPU), digital signal processor (DSP), field-programmable gate array (FPGA), or other circuit suitable for executing instructions or performing logic operations. The at least one processor may be configured to communicate with electronic components (e.g., a modem) within the bonding device and to control at least one of the components.

In some embodiments, instructions executed by processors 212 and 292 may be pre-loaded into a memory unit integrated with or embedded into processors 212 and 292, or stored in a separate memory unit having erasable and/or non-erasable memory banks, such as a RAM, a ROM, or a hard disk. In the alternative, the Instructions executed by processors 212 and 292 may be received from a separate device (e.g., computing device 207). While, for ease of illustration, FIG. 2 illustrates a single processor per bonding device, it should be understood that, consistent with embodiments of the disclosure, functionality may occur in a single processor or may be split among multiple processors.

In some embodiments, the at least one processor (e.g., processor 212 and processor 292) can control any number of modems, and the number of modems may vary over time. The term "control a number of modems" as used herein refers to any relationship, linkage, or action between at least one processor and the modem(s) (e.g., wireless modems) for facilitating control or a transfer of data. For example, the at least one processor may control a modem if it is enabled to perform a handshake with the modem to enable transmission of data streams, traffic, packets, network-related information, etc. In FIG. 2, processor 212 controls a plurality of first wireless modems, for example, modem 223, modem 226, and modem 229. Whereas, processor 292 controls at least one second wireless modem, for example, modem 283, modem 286, and modem 289.

In some embodiments the bonding device may include modem managers. For example, first bonding device 210 includes modem mangers 215, and second bonding device 290 includes modem mangers 295. The modem managers may include hardware, software, or both. The modem managers may manage the transmission or reception of the plurality of data streams over the at least one wireless communications network modem, which may be external to the bonding device itself. The number of modem managers does not have to be the same as the number of actual modems. Therefore, for example, bonding device 210 may include special-purpose, dedicated hardware circuits for channel bonding, or it may perform the bonding functions described herein using standard hardware components under the control of software for this purpose. Bonding device 210 may also use a combination of standard and special-purpose hardware and software components. As discussed above, the bonding device may be a general purpose device (e.g., a smartphone, a tablet) running a bonding software (e.g., a bonding application). In this case the modem manager can be part of the bonding software that performs the functions described herein.

In some embodiments first bonding device 210 can communicate with an Internet server or with second bonding device 290 via a plurality of parallel data channels. The term "data channels" (also referred to herein as "links") refers to any paths between two components or nodes in which data streams, datagrams, or packets may be relayed (transmitted or received). For example, a smartphone may include a cellular modem and a WiFi modem. In some cases, the WiFi modem may be tethered to another cellular device (e.g., a MiFi or another smartphone acting as a WiFi Access Point). In this case, the two bonded channels may be cellular. In the example illustrated in FIG. 2, each bonding device may control a plurality of modems, so that the communication between the two bonding devices can take place via a plurality of parallel data channels. Specifically, first bonding device 210 may communicate via four data channels (three wireless data channels 232, 236, and 238, and one wired data channel 234). Second bonding device 290 may also communicate via four data channels (three wireless data channels 272, 276, 278, and one wired data channel 274).

In some embodiments the plurality of parallel data channels may be associated with at least one communications network. The term "communication network" refers to any network enabling two nodes to communicate. The at least one communications network may include any network technology, standard, or network operator used to transmit or receive data between the two nodes. The at least one communications network can include wireline-based networks, such as: xDSL, cable modem, fiber optics, LAN, Ethernet, etc.

In some embodiments, the at least one communications network may include one or more wireless networks that can use different technologies and standards. For example, the at least one communications network may include different types of cellular networks (e.g., network 249, network 269) such as: GSM, CDMA, 2G, 2.5G, 3G, 4G, LTE, LTE-Advanced, public safety LTE, and Operator X network; different types of satellite networks (e.g., network 243, network 263) such as: Broadband Global Area Network (BGAN), a Very Small Aperture Terminal (VSAT) Network, a Satcom network, a Satcom-on-the-move (SOTM) network, a Fixed Satellite Services (FSS) network, a Mobile Satellite Services network (MSS), a geostationary-based satellite network, a low Earth Orbits (LEO) network, a Molniya orbits-based satellite network, and any custom/proprietary satellite network; and different types other wireless network (e.g., network 246, network 266), such as: WiFi, Wimax, Wibro, Point-to-Point microwave, proprietary network, COFDM networks, mesh networks, ad-hoc networks, Zigbee, Bluetooth, UWB, NFC and others.

As mentioned above, bonding devices can facilitate a media transmission over at least one wireless communications network. The term "media transmission" includes transmission of any data that may include video or a portion thereof. The data may be received in an digital form (e.g., SDI, HDMI, h.264, h.265, JPEG-2000, AVC, AAC, AC-3, AMR, LPCM, ADPCM, FFmpeg, PDM, ALAC, or others), or in an analog form (e.g., composite, component, RCA, or others). The data may include a live video, a near-live video, or a pre-recorded/processed video. The term "live video" may include a video received from a source (e.g., camera, video recorder, IP video stream) and transmitted with the intention of minimizing delay in the transmission, in accordance with transmission conditions and required performance. Thus, a "live" transmission encompasses levels of delay that customarily exist in in live broadcast video transmissions. Customary delays in "live video" may occur as the result of video encoding processing time, a modem internal buffer, internal device processes, network schedule timing, etc. The term "near-live video" refers to a transmission in which the user requirements and/or the network conditions do not allow live transmission. For example, if the transmitting device is in an area of poor coverage.

In some embodiments each of the first and second bonding devices includes a processor configured to receive network-related information from a network device (e.g., network component 252). The term "network-related information" refers to any data and/or instructions associated with the condition of at least one communication network, or the condition of at least one connection (e.g., modem) supported by the at least one communication network. The network-related information may be received from a network component or from another source (such as prior knowledge or configuration information). The network-related information may include substantially real-time information that reflects a current state or upcoming state or a terminating state of at least one data channel from the plurality of parallel data channels. Alternatively, the network-related information may include static information, near-real-time information, or off-line information. Network bonding manager 250, which can be part of the application layer, may use this network-related information to enhance and improve the bonding and QoS. In one example, information received from one or more base stations may contain data related to bandwidth available to first bonding device 210 (e.g., current uplink, max uplink, and/or downlink bandwidth available for each modem).

The network-related information may be reflective of network conditions that influence a capacity of at least one of the plurality of data channels. For example, the network-related information may include latency-related information, error-rate-related information, location-related information, RF-related information, modulation-related information, barrier-related information, number of users served, planned handover timing, information related to the capabilities of users attempting to connect, information related to load on access channels, access-related information (e.g., the number of access attempts or the time to access), congestion-related information, QoS-related information, neighboring cells statistics, etc. In some embodiments the network-related information may be reflective of network conditions that influence performances of at least one of the plurality of first wireless modems. In some cases a portion of the network-related information may be received from the modem itself, and a different portion of the network-related information may be received from one or more network components.

In some embodiments the network-related information may be transmitted to the bonding devices from a network component configured to facilitate a media transmission over at least one wireless communications network. The term "network component" as used herein refers to any element of a network, whether software hardware or any combination thereof, including a dynamic network component or a network component placed within the end-user device. For example, network component 252 may include base stations, gateways, modems, chipsets, communication processors, identity cards (e.g., SIM), and so forth. Network component 252 may manage at least a portion of the traffic passed in the network, or manage at least a portion of the operation of the network. For example, a network component may be an element in a network router, gateway, server, base station, Access Point, RAN node, eNode, RNC, xGSN, xMSC, HLR, VLR, End-User (EU) device, L2 and PHY processor and/or manager, xSIM processor, etc. Network component 252 may communicate with a bonding client 255, which may be implemented within network component 252. Bonding client 255 may alternatively be a software client residing next to components of the networks, for example, at edges or central locations. Additionally or alternatively, network component 252 may communicate with network bonding manager 250 via link 251. Additionally or alternatively, network component 252 may communicate directly with first bonding device 210 using network 249, and with second bonding device 290 using network 269.

Network component 252 may be located intermediate a first end node of the media transmission side (e.g., first bonding device 210) and a second end node of the media transmission side (e.g., second bonding device 290). The term "located intermediate" as used herein means that the network component 252 may have a physical location or MAC address discrete, or distinguishably separated, from the first end node and the second end node. In some embodiments network component 252 may also be physically co-located with any of the said bonding devices or components as well, in part or in full, but distinguishably separated from the bonding device (e.g., having different MAC address). The media transmission side may include a plurality of first wireless modems and the media reception side may include at least one second wireless modem, such that a plurality of parallel wireless data channels extend between and connect the plurality of first wireless modems with the at least one second wireless modem. In addition, network component 252 may include a processor configured to retrieve network-related information from at least one wireless communications network element.

In some embodiments, network component 252 may transmit network-related information to the media transmission side to cause a redistribution of a plurality of data streams or substreams or individual packets handled by at least some of the plurality of first wireless modems. In addition, network component 252 may transmit network-related information to the media reception side to adjust the receipt of the plurality of data streams at the plurality of second wireless modems. In other embodiments, network component 252 may receive performance-related information from either the media transmission side or the media reception side. Network component 252 may use the performance-related information to make a determination when managing network resources of the at least one wireless communications network.

Network component 252 may communicate directly with the bonding devices or with network bonding manager 250. The term "network bonding manager" refers to an entity that can use the network-related information and make decisions that affect the distribution or the receipt of the plurality of data streams associated with the media transmission. Network bonding manager 250 may reside, for example, in the cloud, in the bonding devices (e.g., first bonding device 210 and/or second bonding device 290), or in a network device (e.g., network component 252). For example, when network bonding manager 250 resides in first bonding device 210, it may use network-related information to adjust the transmission of the plurality of data streams from the plurality of first wireless modems (e.g., 223, 226, and 229). When network bonding manager 250 resides in second bonding device 290, it may use network-related information to adjust the receipt of the plurality of data streams at the plurality of second wireless modems (e.g., 283, 286, and 289).

In some embodiments network bonding manager 250 can decide based on the network-related information how to improve performance of the bonding devices. The decisions made by network bonding manager 250 may impact both the performances of the bonding devices and potentially the network resources utilization and performance of other wireless devices served by network bonding manager 250. Therefore, network bonding manager 250 may provide information related to certain of its decisions to other network elements, servers, applications, cellular operator's Home Location Register (HLR), base stations, etc. In addition or alternatively, network bonding manager 250 may send to the network performance-related information to enable a determination to be made about managing at least some of the network resources of the at least one wireless communications network.

Figure 3:
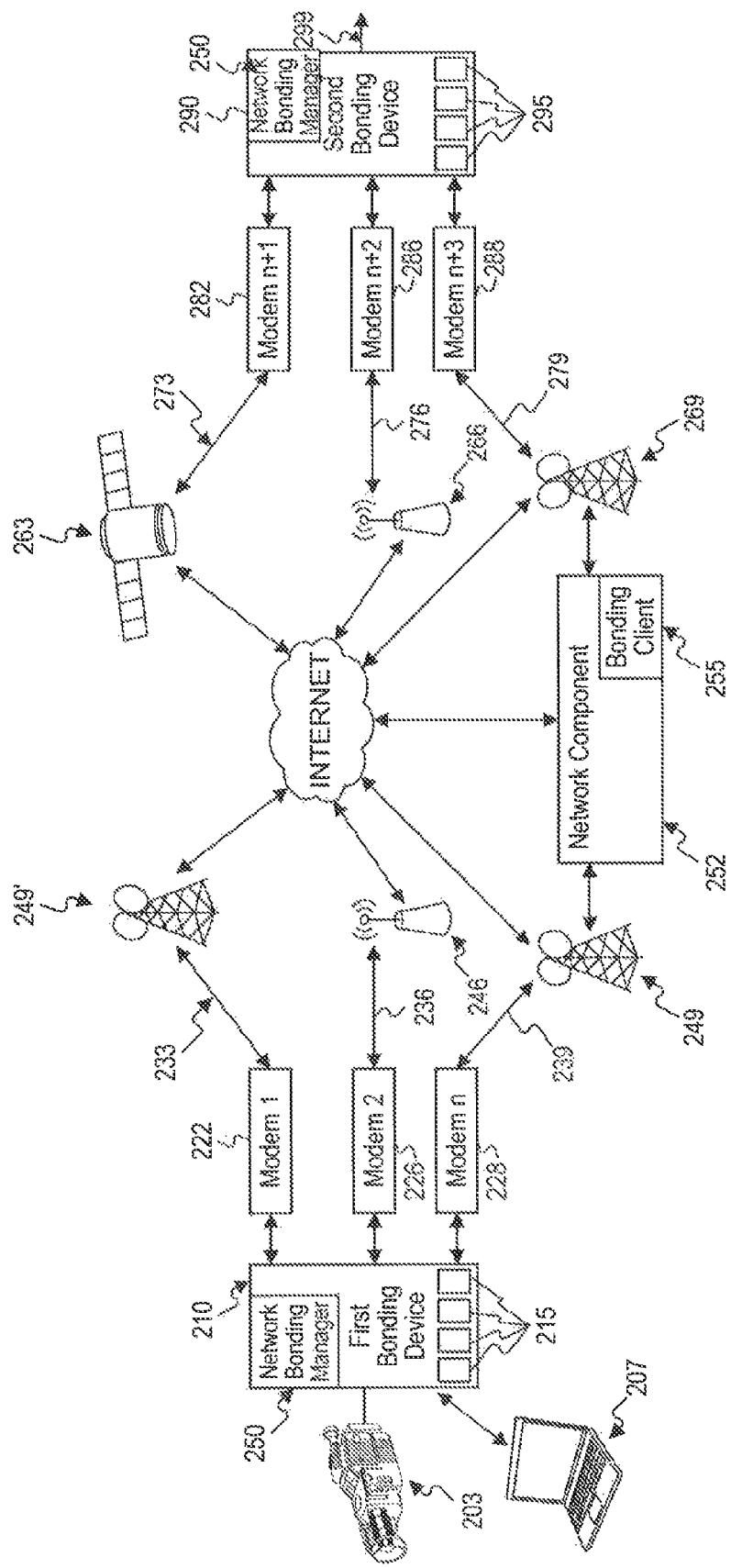
FIG. 3 is a schematic illustration of the communication paths between two bonding devices according to a second embodiment of the present disclosure.

FIG. 3 is a schematic illustration of the communication paths, according to a second embodiment, in which network bonding manager 250 resides in an end-user device. Specifically, FIG. 3 depicts an embodiment in which one network bonding manager 250 resides in first bonding device 210, and a second network bonding manager 250 resides in second bonding device 290. Accordingly, network bonding manager 250 is configured to make a determination about adjusting the distribution (or receipt) of the plurality of data streams based on the network-related information it had received from network component 252. Network bonding manager 250 may receive the network-related information directly via network 269, or via the Internet.

In some embodiments, network bonding manager 250 may consider the network-related information received from network component 252 in order to make certain decisions. For example, the network-related information may indicate that the total available bandwidth in a specific base station currently serving the bonding device's modems is limited to X1; or that the available bandwidth for one of such modems is X2; or that the current modulation being used by a certain modem is Q1; or that a handover is expected in S1 time; or that a handover has just ended; or that a handover is expected to take place in T1 duration; or that barrier is changed or allocated to be B1, etc. Network bonding manager 250 may use this information to guide the bonding devices in taking actions. For example, network bonding manager 250 may inform the bonding devices to use modem M1 up to R1 bandwidth at the moment, or to stop using it altogether, or to use modem M1 for certain level or types of packets (e.g., lower priority ones).

In some embodiments, network bonding manager 250 may decide to adjust the distribution of the plurality of data streams. Adjusting the distribution of the plurality of data streams may include at least one of: transmitting fewer data streams from some of the plurality of first wireless modems and transmitting more data streams from others of the plurality of first wireless modems, ceasing the transmission of data streams from some of the plurality of first wireless modems for a period of time, starting the transmission of data streams from some of the plurality of first wireless modems, changing an encoding of some data streams, changing a Forward Error Correction (FEC) of some data streams. For example, instead of transmitting from a specific modem packets that may not arrive (e.g., due to high error rate), first bonding device 210 may transmit fewer packets from the specific modem.

In addition network bonding manager 250 may instruct first bonding device 210 to tune its video encoder, based on the network-related information. For example, when some of the modems of first bonding device 210 are expected to have more bandwidth, bonding device 210 may change its encoding and transmission performance using a predictive algorithm. In this way the quality of the media transmitted may improve. In some embodiments, the video encoder output may be increased or decreased in fewer steps and shorter interim adjusting and measurements periods. Therefore, the allocation of the plurality of data streams to the various available modems may be performed more quickly and more accurately. Such adjustment may be done in advance, e.g., before a data stream is first allocated to a modem, or as a readjustment so that packets waiting to be transmitted by a certain modem manager may be redistributed to another.

In one embodiment, first bonding device 210 may be a smartphone that runs a bonding software application, and has one cellular modem and one WiFi modem. For example, first bonding device 210 may receive a stream of packets over its own cellular modem and its own WiFi modem according to their momentary capacity, and the performances of other modems and connections on the sending side (e.g. a cellular operator, a video publisher such as YouTube™, a CDN, an ISP, an OTT or internet TV-like operator). The combined stream of packet may be reassembled to a single coherent media stream for consumption. At any point in time, the serving network operators may provide network-related information (either "push" or "pull") to network bonding manager 250. Again, network bonding manager 250 may reside in first bonding device 210 (e.g., the smartphone), in network component 252, or in the cloud. In this manner, network bonding manager 250 may better predict the potential performance on each of the two modems and the two networks. Network bonding manager 250 may then guide first bonding device 210 to offload packets from one network to the other in a certain degree, or to change other performance-related metrics, such as the video encoding rate, FEC transmission, etc.

In embodiments in which first bonding device 210 is implemented using a smartphone, the device may include pre-installed bonding software (e.g., LU-Smart mobile app by LiveU Corporation). The bonding software may instruct at least one processor of first bonding device 210 to split a data stream into several portions, such that each portion will be transmitted concurrently (or substantially concurrently) via differing wireless communication routes. In the example illustrated in FIG. 3, first bonding device 210 splits the raw data stream into three portions and uses the combination of modems 223, 226, and 229 as a virtual broadband upload connection. The first portion is transmitted via cellular network 249; the second portion is concurrently transmitted via a second cellular network 249'; and, the third portion is concurrently transmitted via wireless network 246 (e.g., WiFi). All three portions of the data stream may be transmitted via the Internet to second bonding device 290, which can reconstruct the three portions into a coherent data stream. In one embodiment the first portion of data stream may include copies of data packets also included in the second portion of data stream. For example, if second cellular network 249' has a high error rate, bonding device 210 may transmit via cellular network 249 copies of some of the data packets included in the second portion transmitted via second cellular network 249'.

In some cases, first bonding device 210 may load balance outgoing data streams to ensure timely reconstruction at a receiving location. For example, the processor of first bonding device 210 may inequitably distribute the portions of the data stream, e.g., such that the first portion may be larger than the second portion. For example, the pre-installed bonding software may inequitably distribute the portions of the data stream when the at least one performance factor of the first wireless communication route is higher than the corresponding performance factor of the second wireless communication route. The at least one performance factor may include a combination of one or more of the following: bandwidth, modem speed, modem reliability, operating license limitations, network congestion, modem error rate, and connection quality.

Figure 4:
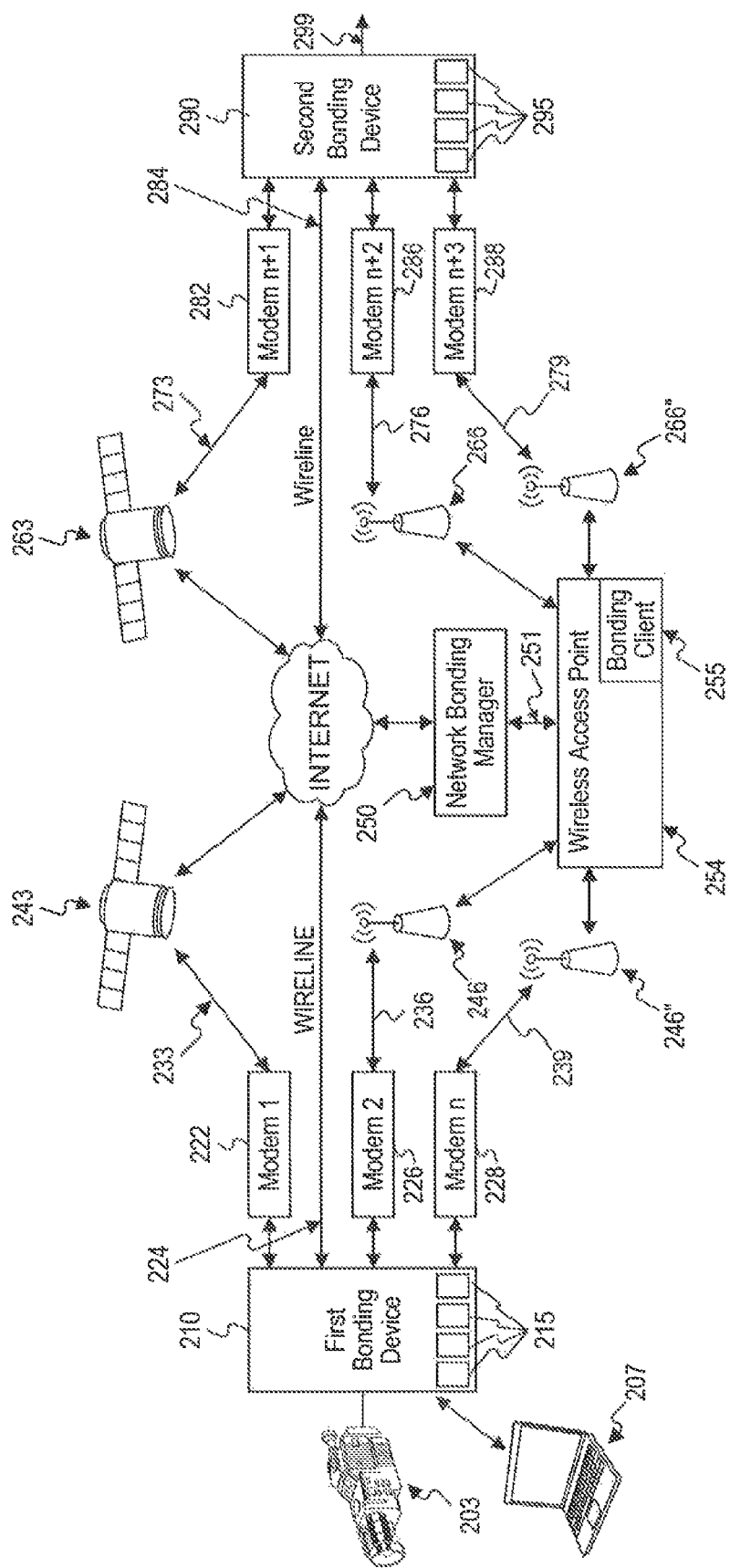
FIG. 4 is a schematic illustration of the communication paths between two bonding devices according to a second embodiment of the present disclosure.

FIG. 4 is a schematic illustration of the communication paths between first bonding device 210 and second bonding device 290, according to a third embodiment in which first bonding device 210 includes two WiFi modems and one satellite modem. Specifically, FIG. 4 depicts an embodiment in which bonding device 210 is used for transmitting a live high-quality video. For some applications, the transmission of live high-quality video may require a certain bandwidth, latency, error rate, and a minimal jitter.

At the beginning of the transmission, network bonding manager 250 may query for information from the wireless operators that serve the area in which first bonding device 210 is located. Such information may include data related to the general service characteristics at that time and location, e.g., the uplink bandwidth currently available to modems 223, 226, and 229. Alternatively, the information may be modem specific, such as the bandwidth available to a certain modem, the modem transmission power, the modem reception of neighboring base stations. It is noted that even two modems getting service from the same wireless carrier may experience different service. Such differences may be caused, e.g., by different angles or RF properties for each of the modems at that point in time, resulting in each of them getting service from another sector or another base station in the network.

In some embodiments, first bonding device 210 may be involved with a handover of one of its modems, network bonding manager 250 may receive network-related information about a predicted handover and guide first bonding device 210 to reduce the load put on that modem. Network bonding manager 250 may instruct the bonding devices to reduce the usage of that modem or even stop using it altogether. For example, network bonding manager 250 may instruct the bonding devices to keep the load in a certain modem below B1 bandwidth from time T1 to T2, with or without margins, due to an upcoming handoff. In other embodiments, the decision may be made directly by first bonding device 210 based on raw network-related information received directly from network component 252 or network-related instructions from network bonding manager 250. The network-related information may be used to allocate more suitable virtual SIMs. For example, if first bonding device 210 (or network bonding manager 250) calculates and predicts that the performance of one of modems 223, 226, and 229 is expected to degrade (e.g., due to an upcoming handover into a cell that is already quite busy and has not sufficient uplink bandwidth available), then it may request to allocate another VSIM for that modem. The same may happen without movement of first bonding device 210, e.g., where the serving base station or network becomes congested due to other reasons.

The use of network-related information by first bonding device 210 (or network bonding manager 250) as part of its decisions making may also impact the networks and the overall resources allocation, including base station power consumption, subsequent air-conditioning, etc. The decisions made based on the network-related information may minimize void or less efficient transmissions by modems 223, 226, and 229; prevent multi retransmissions; avoid transmissions of data that might not be properly fulfilled; or reduce noise levels experienced by other devices. Further, the decisions made based on the network-related information may cause other devices to make fewer attempts to access the network. In this manner, the decisions can increase their users' experience, including by increasing battery time and applications performance.

Figure 5:
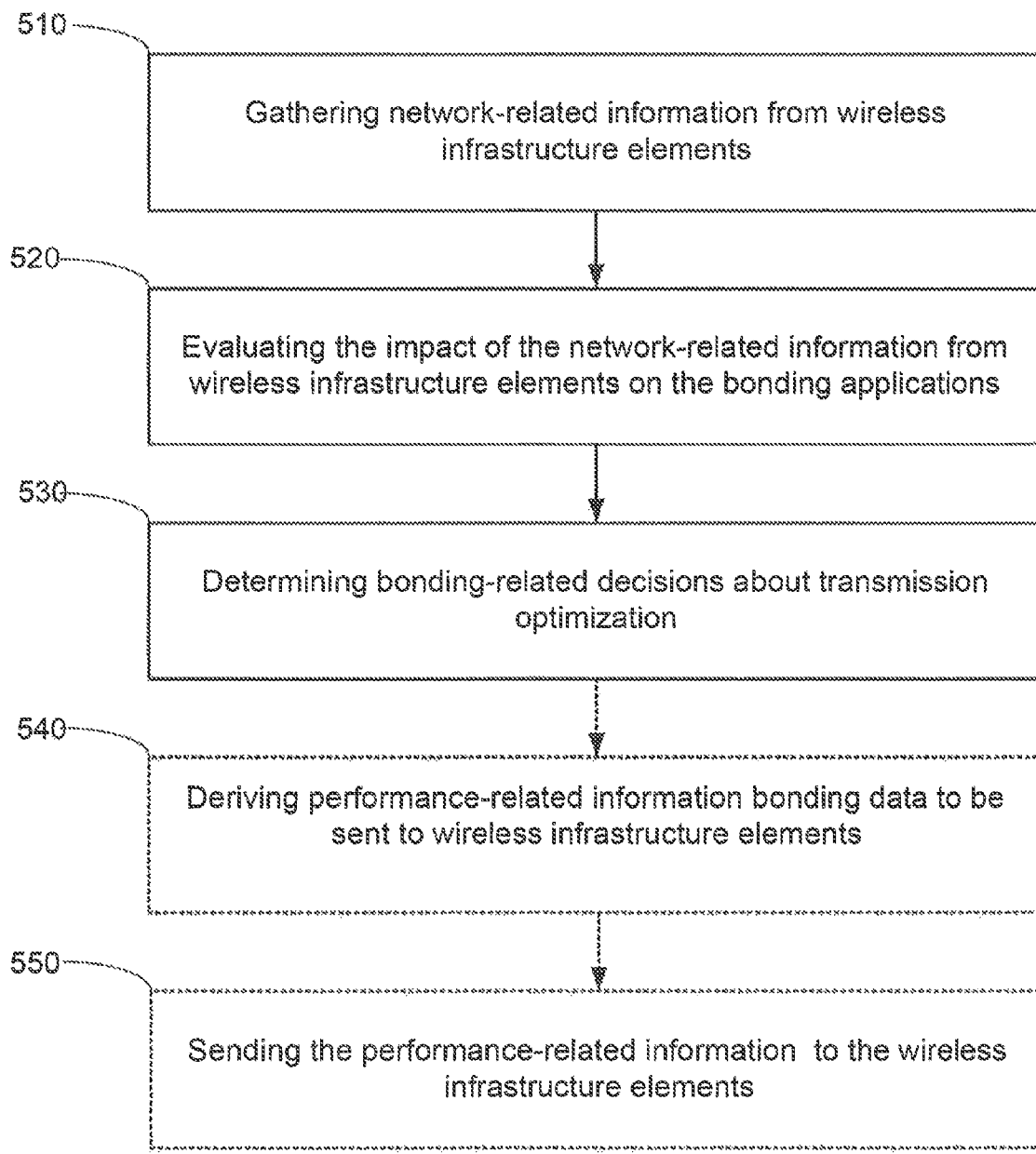
FIG. 5 is flow chart illustrating an overview of an exemplary method according to some embodiments of the present disclosure.

FIG. 5 is a flow chart of an exemplary method 500 for enhanced bonding and network utilization using interaction between a bonding application and a network device, consistent with embodiments of the present disclosure.

In step 510 a bonding element (e.g., first bonding device 210, second bonding device 290, and network bonding manager 250) hosting the bonding application gathers data from various wireless network elements (such as base stations, RAN, WiFi Access Points, modem MAC/Phy layers). The bonding application may be in the cloud, in network bonding manager 250, in the bonding devices, and/or in a network component. The bonding element may gather the network-related information in an interrupt, unsolicited period, occasionally per event modes, and/or per request mode.

In addition, the bonding element may decide to trigger an inquiry for information from a specific network element or from a plurality of network elements. In one example, a bonding element that experiences a change in the performance of one of the modems (e.g., a sudden drop in bandwidth, an increase in error rate, or increase in latency) may trigger a request for information needed to understand whether this change can be explained by an occurrence at the infrastructure/networking level, and can therefore be mitigated.

In step 520 the bonding element processes the network-related information and evaluates its impact on the bonding. The bonding element may use the network-related information to optimize the transceiving of data streams. The following two examples show how the network-related information may be used by the at least one processor to determine how to split the raw data stream over the different modems.

In the first example, the network-related information received from the network component includes information that reflects a network congestion state. A network congestion state (or simply, congestion) is a situation where the network resources may be significantly over-burdened. Such situations might occur due to various reasons, for example, a surge in call attempts, a very large data trafficking, insufficient initial resource allocation, deficient network management planning, a malfunction, and/or malicious attack. Based on the information that reflects a network congestion state or an anticipated congestion state or a terminating state, the at least one processor may determine which network to use, and in what capacity. For example, the at least one processor may determine to shift data from a cellular network that is experiencing congestion to a WiFi network.

The information that reflects a network congestion state may include measured uplink data bandwidth, measured uplink data latency, measured downlink data bandwidth, measured downlink data latency, measured uplink round trip time, measured downlink round trip time, uplink packet loss rate, downlink packet loss rate, network component state, and/or other network initiated congestion indications. In addition or alternatively, the information that reflects a network congestion state may include Congestion Experienced (CE) codepoint ('11') in PDCP SDUs in the downlink direction to indicate downlink (radio) congestion. If those PDCP SDUs have one of the two ECN-Capable Transport (ECT) codepoints set, the Congestion Experienced (CE) codepoint ('11') in PDCP SDUs in the uplink direction may indicate that uplink (radio) congestion if those PDCP SDUs have one of the two ECN-Capable Transport (ECT) codepoints set.

In the second example, the network-related information received from the network component includes handover-related information that enables the bonding element to identify a handover of a specific modem. Based on the handover-related information, the at least one processor may determine and evaluate how the handover (e.g., an expected handover, an ongoing handover, or a finished handover) may impact the transmission or receipt of the data streams. In one instance, first bonding device 210 may transmit using at least a first wireless network (e.g., a cellular network) and a second wireless network (e.g., WLAN), such that some of the plurality of parallel wireless data channels are associated with the first wireless network and others of the plurality of parallel wireless data channels are associated with the second wireless network. In that case, the network-related information may include information related to a handover of one or more modems associated with the first wireless network. First bonding device 210 may use the network-related information to redistribute the plurality of data streams by transmitting more data streams via data channels associated with the second wireless network and transmitting fewer data streams via data channels associated with the first wireless network. The redistribution of the plurality of data streams may result in fewer packets lost, fewer retransmissions, and/or fewer network resources being allocated and used. The redistribution of the plurality of data streams may be expressed in lower power consumption, in lower communication cost, in improved QoS and/or application performance (such as lower latency or content quality).

In step 530 the bonding element (e.g., first bonding device 210, second bonding device 290, and network bonding manager 250) determines bonding-related decisions, for example, decisions about transmission optimization and different settings (e.g., how to adjust the overall traffic generation by reducing a video encoder output bandwidth). In some embodiments, transmission optimization may be done by reducing the usage of certain connections, modems or operators due to information about their performance. The transmission optimization may be at the performance level, at the cost level, or at the user experience level, and could be done from either the bonding devices perspective, from the network operator perspective, or both. For example, the bonding element may determine to stop using a specific data channel because another data channel is expected to enable more traffic.

Step 540 is an optional step. In step 540 the bonding element may provide to the network component performance-related information regarding the at least one wireless communications network. The term "performance-related information" refers to information collected by a bonding element. The performance-related information may be measured and reflective of performances of at least one wireless communications network. Such performance may be measured at the application level, and/or the bonding management level. For example, the performance may be measured using one or more of the following parameters: bandwidth, goodput, latency, error rates, lost packets, jittery behavior, and behavior over time. For example, the performance-related information may be based on measurements associated with the performance of one or more of the connections, modems, technologies or operators. The performance-related information may be represented by single parameter, statistical, accumulated, sporadic, momentary, and/or averaged information, etc. In addition, the performance-related information may include bandwidth requirements, experienced bandwidth, and/or congestion-related information that may assist the at least one wireless communications network to manage a state of congestion.

Step 550, which is also optional, includes sending the performance-related information to network devices (e.g., network component 252). In some embodiments, first bonding device 210 may forward network component 252 information about the measured performance of a WiFi connection currently available to first bonding device 210, in particular in the case that such connection belongs to or is associated with the same or affiliated cellular operator. The performance-related information may enable a determination to be made about managing network resources of at least one wireless communications network. The determination may include at least one of: managing data, wireless offloading, improving resource utilization, reducing power consumption, reducing cost, and increasing wireless handover efficiency. The determination may affect either the network components and/or operator; the end-device, application and/or user and/or a multiplicity of other users, devices or applications served by the same or impacted resources; or any combination thereof.

In some embodiments, the determination may be based on the performance-related information of the relevant communication channels (e.g., in real time and/or statistical parameters measurements and calculations). In such embodiments, the network devices may rely on real data from the real devices also pertaining to the application level, such as parameters of the application-experienced bandwidth, goodput, jittery behavior, latency, etc. Therefore, such decisions may optimize or improve QoS for one or more channel, device, application or user (one or more of each), local or overall network performance (such as the local or overall utilization of base stations, backhaul or other infrastructure resources, power consumption, bandwidth, etc), cost, etc. Further, the performance-related information may be collected or further delivered by network component 252 (or others) for offline/online (real time) analysis, ongoing abnormalities, ongoing fault analysis and/or identification, pattern identification, user and/or applications pattern and behavior studies, network adaptations, parameters adaptations, network planning or optimization, etc.

For example, assume that the at least one wireless communications network includes at least a first wireless network and a second wireless network, such that some of the plurality of parallel wireless data channels are associated with the first wireless network and others of the plurality of parallel wireless data channels are associated with the second wireless network. In this case the determination about managing network resources may include offloading at least some of the plurality of data streams from the first wireless network to the second wireless network when the performance-related information associated with the second wireless network indicates that the second wireless network currently has satisfactory performance. Specifically, following the example illustrated in FIG. 2, the performance-related information may be used by a network device in deciding whether to instruct first bonding device 210 to offload part of the traffic from cellular network 249 to WiFi network 246. The performance-related information may also be used by the network to similarly decide for other devices, not related to first bonding device 210. For example, network component 252 may use real time measurements from first bonding device 210 to manage the service of regular cellular users in that area.

According to other embodiments a communications device (for example, a bonding device) that can assist managing at least one wireless communications network is provided. The communications device is configured to manage distribution (or receipt) of a plurality of data streams over a plurality of parallel data channels. The bonding device may cause performance-related information to be sent to a network component (e.g., network component 252), thereby enabling a determination to be made about managing network resources of the at least one wireless communications network, based on the performance-related information.

Figure 6:
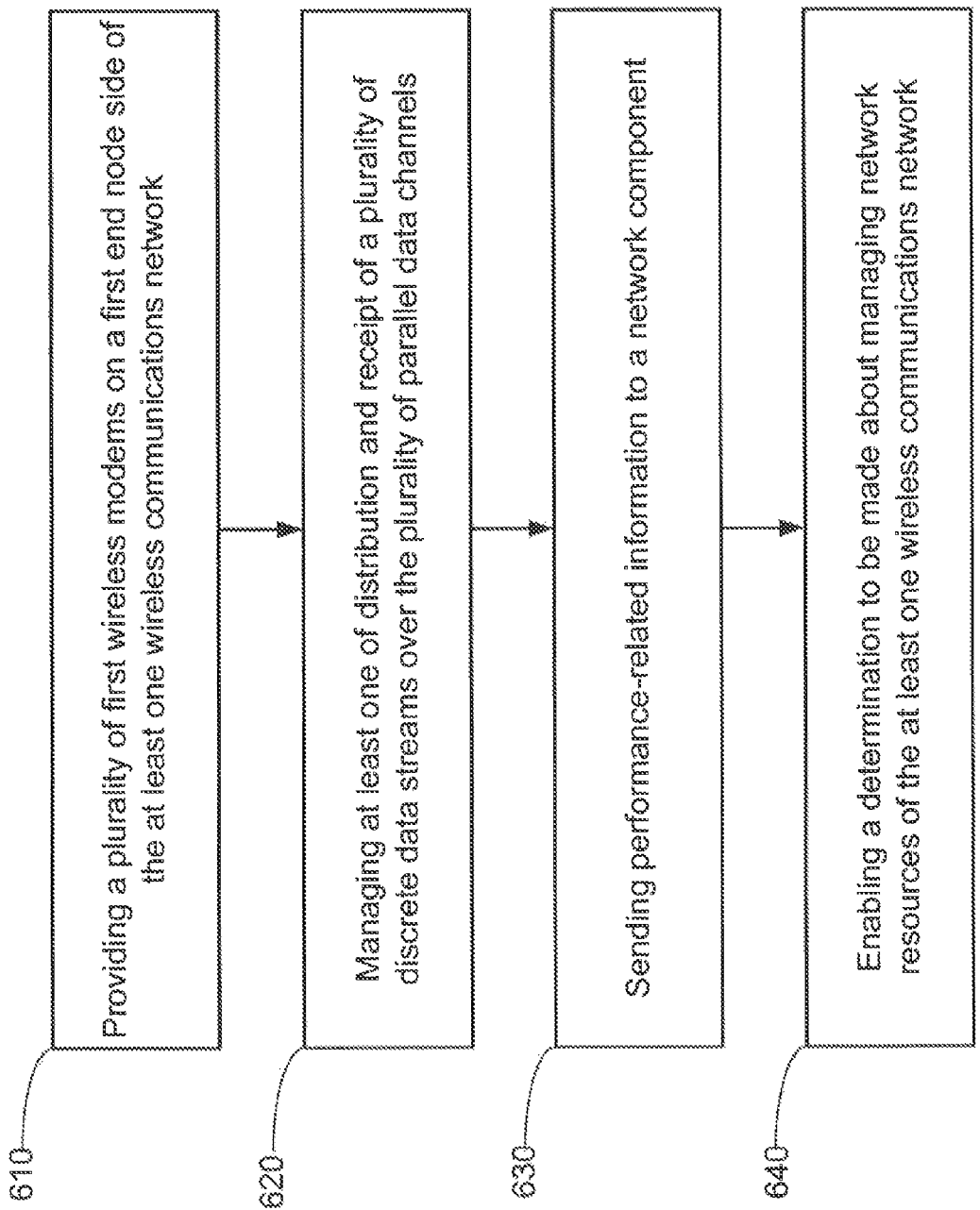
FIG. 6 is flow chart presenting an overview of an exemplary method according to different embodiments of the present disclosure.

FIG. 6 is a flow chart illustrating an exemplary method for assisting in managing at least one wireless communications network, according to some embodiments of the disclosure. Step 610 includes providing a plurality of first wireless modems on a first end node side of the at least one wireless communications network. The plurality of first wireless modems can communicate via a plurality of parallel wireless data channels with at least one second wireless modem associated with a second end node side of the at least one wireless communications network. Step 620 includes managing at least one of distribution and receipt of a plurality of data streams over the plurality of parallel data channels. The media transmission, which may be transmitted or received by the bonding device, comprises an aggregate of the separated plurality of data streams. Step 630 includes sending performance-related information to a network component. The network component may be located on the data/command protocol path, proxy of the first end node and/or proxy of the second end node, but separated from the first end node and the second end node. Step 640 includes enabling a determination to be made about managing network resources of the at least one wireless communications network, wherein the determination is based on the performance-related information.

In some embodiments, the bonding device (or network bonding manager 250) may provide information to network elements regarding the actual performance experienced by a certain modem, for example, the actual bandwidth it currently sees, the latency, and/or the error rates. This performance-related information may then be used by the network elements as input to its PHY, L2, or network level decisions. For example, the network may allow more or fewer modems into a cell served by a base station, reduce or increase the allocated bandwidth to a group of modems, and/or initiate a forced handover to move certain modems to other cells where a better performance may be experienced. In addition or alternatively, the network may use the performance-related information to offload traffic from some of the modems by changing technologies (e.g., from LTE to 3G) and/or networks (e.g., from LTE to WiFi or Wibro). The performance-related information may reflect the actual information experienced by first bonding device 210. In some embodiments, network bonding manager 250 may facilitate artificial intelligence or machine learning, to improve later recommendations and decisions.

In some embodiments the network elements may use the performance-related information (e.g., application level and/or bonding level information and parameters) it receives for various other tasks, such as: learning time and/or location-related patterns, user-related patterns, application-related patterns, and/or abnormalities analysis. Doing so enables real time or offline corrections to be made. The performance-related information may also be used for network planning, statistical analysis, power consumption planning and analyzing, etc.

In some embodiments, first bonding device 210 may be implemented by a smartphone that runs bonding software and has one cellular modem and one WiFi modem available to it. At any point in time, the serving operators may provide network-related information (either "push" and/or "pull") to network bonding manager 250. Network bonding manager 250 may in turn provide performance-related information to the cellular and/or the WiFi network regarding the actually experienced performance by the modems in that certain location and time. The network may use the received information in various roaming and offloading applications to provide a more seamless and continuous service with a better quality of experience to the user. These roaming and offloading applications may consider actual application-level experience, measurements and requests, while also relying on actual information pertaining to the performance in other networks.

In another example, the roaming and offloading applications may include heterogeneous network (hetnet) and roaming between commercial and dedicated-networks, such as in the planned USA FirstNet public safety communication network. A hetnet is a network consisting of multiple cells with different characteristics. The main intention of such networks is that the low power nodes or small cells can be overlaid on top of the macro cells, and then can offload the macro cells and improve indoor and cell edge performance.

The bonding device (e.g., first bonding device 210) can assist offloading in such hetnet deployments (e.g., simultaneous usage of multiple nodes using multiple modems in the device). For example, the following information may be used: the exchange of wireless network, nodes, connectivity, state (e.g., handover), bandwidth (e.g., available backhaul), and monitored performance (e.g., as measured by bonding device) between the end-user devices or third party cloud-based applications and the network elements. Such information may be available to end-user devices, or cloud applications, and their application level software. In addition, the performance-related information, which can be used by the elements, may include information monitored in real time or statistical information from the end-user devices.

In other embodiments, first bonding device 210 (or network bonding manager 250) may also assist the at least one communications network to identify and handle network congestion. For example, during a sudden event (such as a terror attack or an earthquake), a large number of people in the area of a certain base station may attempt to access the network over the Random Access Channel (RACH), more or less at the same time, thus creating collisions, backing-off, and reattempting. Therefore, in times of congestion it may be highly desirable to allow communication of one device while preventing, or even disconnecting another device. For example, in a terror attack, first responders may need to get service over a commercially available network, even at the expense of other customers. In addition, first bonding device 210 may use information from the at least one communications network (e.g., the location of the user or Cell ID) to include low volume "emergency" signaling. For example, first bonding device 210 may use a low bandwidth communication method over the data channels to inform the service of its operational status or other information.

In some cases network congestion may occur on any of the network resources. For example, network congestion may occur on the cellular signaling channels (on which SMSs are being exchanged), on the RACH, on the base stations backhaul, on the internal or external backbones, on other infrastructure channels. In some embodiments, first bonding device 210 (or network bonding manager 250) may identify the network congestion by using congestion indications, e.g., Explicit Congestion Notification (ECN) in LTE. Alternatively, first bonding device 210 (or network bonding manager 250) may identify congestion using indirect information extracted from the network (e.g., network-related information), and act accordingly. For example, first bonding device 210 may avoid using that network altogether, and network bonding manager 250 may instruct one or more bonding devices being served by the same base station to stop using that network. Thereby, the overall utilization for all devices may be improved.

In other embodiments, when network congestion is identified, first bonding device 210 (or network bonding manager 250) may instruct the at least one communications network to resolve the congestion. For example, network bonding manager 250 may instruct the at least one communications network to change its transmitted system ID to a new ID. Doing so may throw out served or attempting devices, clear the RACH and data channels, and allow only devices that still have the new system ID as a potential System ID in their database to connect. Such devices may belong to special customers, to first responders, etc. In a different embodiment, first bonding device 210 may instruct the network to provide power reports that over-report the received power so that other modems, receiving service from the same base station, would believe their transmission to be too strong and thus lower their transmission power, which may reduce the overall noise and interferences.

Figure 7:
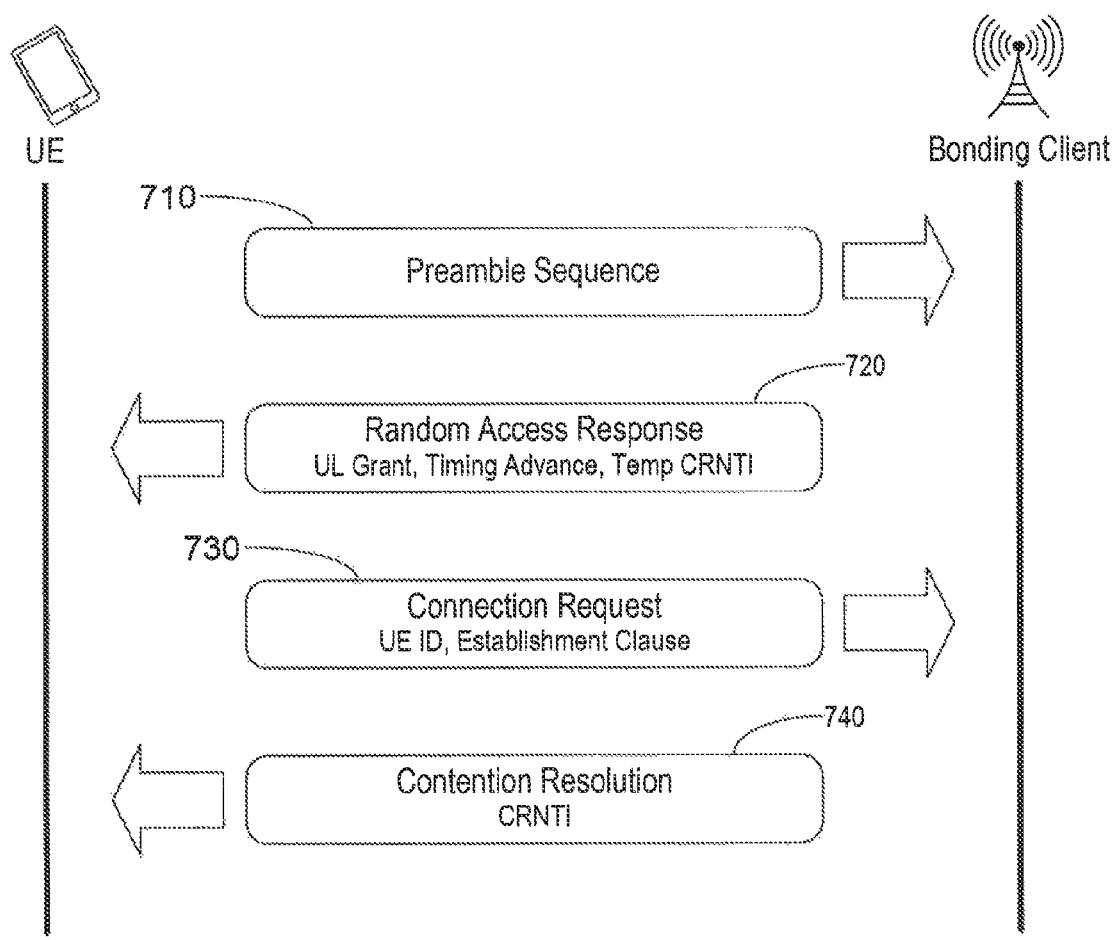
FIG. 7 is a flow chart of an exemplary method of a user device attempting to connect with a bonding client in a cellular network.

FIG. 7 is a flow chart of an exemplary method of connecting User Equipment (UE) to the at least one communication network. The at least one communications network (e.g., cellular network 249) may include a bonding client element (e.g., bonding client 255) configured to enable transmit/receive notification to/from the UE (e.g., first bonding device 210).

In step 710 the UE sends preamble sequence to the bonding client. The UE gives its own identity to the network so that the network can address it in next step. The identity which UE will use may be called RA-RNTI (Random Access Radio Network Temporary Identity). The RA-RNTI may be determined from the time slot number in which the preamble is sent. If the UE does not receive any response from the network, it may increase its power in fixed steps and send the preamble again.

In step 720 the bonding client sends "Random Access Response" to UE on DL-SCH (Downlink Shared Channel) addressed to RA-RNTI, calculated from the timeslot in which preamble was sent. The message may carry the following information: a cell radio network temporary identity (C-RNTI) for further communication, change in the timing (Timing Advance Value) for enabling the UE to compensate for the round trip delay caused by UE distance from the bonding client, and/or assignment of initial resource to UE (Uplink Grant Resource), so that it can use the uplink shared channel.

In step 730 the UE sends a message requesting to connect to the network associated with the bonding client. The message may contain the UE identity and connection establishment cause, which may indicate the reason why the UE needs to connect to the network. In step 740 the bonding client may respond with a contention resolution message to UE, informing that the message was successfully received in step 730. This message may contain a new C-RNTI which may be used for further communications.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks, floppy disks, or CD ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C), Java, C++, Objective-C, HTML, HTML/AJAX combinations, XML, or HTML with included Java applets. One or more of such software sections or modules may be integrated into a computer system or existing e-mail or browser software.

Moreover, while illustrative embodiments have been described herein, the scope of any and all embodiments includes equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A communications device configured to facilitate a media transmission over at least two wireless communications networks, including at least a first wireless network and a second wireless network, the communications device comprising:

at least one processor configured to:

control a plurality of first wireless modems associated with a first end node side of the at least two wireless communications networks, and to communicate via a plurality of wireless data channels with at least one second wireless modem associated with a second end node side of the at least two wireless communications networks, wherein some of the plurality of wireless data channels are associated with the first wireless network, and others of the plurality of wireless data channels are associated with the second wireless network;

manage at least one of distribution and receipt of a plurality of data streams over the plurality of wireless data channels, wherein the media transmission comprises an aggregate of the plurality of data streams; and receive network-related information from a network component associated with one of the at least two wireless communications networks;

use the received network-related information to adjust at least one of distribution and receipt of the plurality of data streams between the plurality of first wireless modems, thereby enabling reconstitution of the media transmission from the plurality of data streams;

wherein adjusting at least one of distribution and receipt of the plurality of data streams includes offloading at least some of the plurality of data streams from the first wireless network to the second wireless network when the network-related information associated with the second wireless network indicates that the second wireless network currently has satisfactory performance.

2. The device of claim 1, wherein the network component is located intermediate the first end node and the second end node, and discrete from the first end node and the second end node.

3. The device of claim 1, wherein the network-related information received is reflective of network conditions that influence a capacity of at least one of the plurality of data channels.

4. The device of claim 1, wherein the network-related information received is reflective of network conditions that influence performances of at least one of the plurality of first wireless modems.

5. The device of claim 1, wherein the network-related includes substantially real-time information that reflects a state of at least one data channel from the plurality of data channels.

6. The device of claim 1, wherein the network-related information received includes information that reflects a network congestion state.

7. The device of claim 1, wherein the plurality of first wireless modems are configured to transmit the plurality of data streams over the plurality of data channels to the second end node side.

8. The device of claim 1, wherein the plurality of first wireless modems are configured to receive the plurality of data streams over the plurality of data channels from the second end node side.

9. The device of claim 1, wherein the at least one processor is further configured to make a determination about adjusting the at least one of distribution and receipt of the plurality of data streams based on the network-related information.

10. The device of claim 1, wherein adjusting the distribution of the plurality of data streams includes at least one of: transmitting fewer data streams from some of the plurality of first wireless modems and transmitting more data streams from others of the plurality of first wireless modems, ceasing the transmission of data streams from some of the plurality of first wireless modems for a period of time, starting the transmission of data streams from some of the plurality of first wireless modems, changing an encoding of some data streams, changing a Forward Error Correction (FEC) of some data streams.

11. The device of claim 1, wherein the at least one processor is further configured to provide the network component performance-related information regarding one of the at least two wireless communications networks.

12. A communications device configured to assist managing at least two wireless communications networks, including at least a first wireless network and a second wireless network, the communications device comprising:
   at least one processor configured to:
      control a plurality of first wireless modems associated with a first end node side of the at least two wireless communications networks, and communicate via a plurality of wireless data channels with at least one second wireless modem associated with a second end node side of the at least two wireless communications networks, wherein some of the plurality of wireless data channels are associated with the first wireless network, and others of the plurality of wireless data channels are associated with the second wireless network;
      manage at least one of distribution and receipt of a plurality of data streams over the plurality of data channels, wherein the media transmission comprises an aggregate of the plurality of data streams;
      cause performance-related information to be sent to a network component from the at least one of first end node and the second end node; and
      enable a determination to be made about managing network resources of one of the at least two wireless communications networks, wherein the determination is based on the performance-related information and includes offloading at least some of the plurality of data streams from the first wireless network to the second wireless network when the performance-related information associated with the second wireless network indicates that the second wireless network currently has satisfactory performance.

13. The device of claim 12, wherein the performance-related information is measured and reflective of performances of at least one application using the at least two wireless communications connections.

14. The device of claim 12, wherein the performance-related information includes congestion-related information that assists one of the at least two wireless communications networks to manage a state of congestion.

15. The device of claim 12, wherein the determination about managing network resources of one of the at least two wireless communications networks include at least one of: managing data wireless offloading, improving resources utilization, reducing cost, and increasing wireless handover efficiency.

16. A network device configured to facilitate a media transmission over at least two wireless communications networks including at least a first wireless network and a second wireless network, the network device comprising:
   a network component located intermediate a first end node on a media transmission side of the at least two wireless communications networks and a second end node on a media reception side of the at least two wireless communications networks, wherein the media transmission side includes a plurality of first wireless modems and the media reception side includes at least one second wireless modem, and wherein the at least two wireless communications networks include a plurality of wireless data channels extending between and connecting the plurality of first wireless modems with the at least one second wireless modem, and some of the plurality of wireless data channels are associated with the first wireless network, while others of the plurality of wireless data channels are associated with the second wireless network, the network component including at least one processor configured to:
      receive network-related information from one of the at least two wireless communications networks, wherein the network-related information includes information related to a handover of a modem associated with the first wireless network; and
      transmit the network-related information to the media transmission side in order to cause a redistribution of a plurality of data streams handled by at least some of the plurality of first wireless modems, wherein the redistribution of the plurality of data streams includes transmitting more data streams via data channels associated with the second wireless network and transmitting fewer data streams via data channels associated with the first wireless network, and the media transmission transmitted over the plurality of wireless data channels comprises an aggregate of the plurality of data streams.

17. The device of claim 16, wherein the media reception side includes a plurality of second wireless modems, and the at least one processor is further configured to transmit the network-related information to the media reception side in order to adjust the receipt of the plurality of data streams at the plurality of second wireless modems.

18. The device of claim 16, wherein at least one of the first end node and the second end node is a smartphone.

19. The device of claim 16, wherein the first wireless network is a cellular network and the second wireless network is a wireless local area network (WLAN).

20. The device of claim 16, wherein the network component is configured to enable a determination to be made about managing network resources of one of the at least two wireless communications networks using performance-related information received from at least one of the first end node and the second end node.

21. The device of claim 20, wherein the determination includes at least one of: managing data wireless offloading, improving resources utilization, and increasing handover efficiency.

22. The device of claim 16, wherein the network-related information is reflective of network conditions that influence a capacity of at least one of the plurality of data channels.

23. The device of claim 16, wherein the network-related information includes substantially real-time information that reflects a current state of at least one data channel from the plurality of data channels.

24. A method for assisting management of one of at least two wireless communications networks, including at least a first wireless network and a second wireless network, the method comprising:
   providing a plurality of first wireless modems on a first end node side of the at least two wireless communications networks configured to communicate via a plurality of wireless data channels with at least one second wireless modem associated with a second end node side of the at least two wireless communications networks, wherein some of the plurality of wireless data channels are associated with the first wireless network, and others of the plurality of wireless data channels are associated with the second wireless network;
   managing at least one of distribution and receipt of a plurality of data streams over the plurality of data channels, wherein the media transmission comprises an aggregate of the plurality of data streams;

sending performance-related information to a network component located intermediate the first end node and the second end node, and from the first end node and the second end node; and enabling a determination to be made about managing network resources of one of the at least two wireless communications networks, wherein the determination is based on the performance-related information and includes offloading at least some of the plurality of data streams from the first wireless network to the second wireless network when the performance-related information associated with the second wireless network indicates that the second wireless network currently has satisfactory performance.

25. The method of claim 24, wherein the performance-related information further includes information reflective of performances of the first wireless network.

26. The method of claim 24, wherein the determination includes at least one of: managing data offloading, improving resources utilization, increasing handover efficiency.

27. A software product stored on a non-transitory computer readable medium and comprising data and computer implementable instructions for carrying out the method of claim 24.

28. A network device configured to facilitate a media transmission over at least two wireless communications networks, including at least a first wireless network and a second wireless network, the network device comprising:

a network component located intermediate a first end node on a media transmission side of the at least two wireless communications networks and a second end node on a media reception side of the at least two wireless communications networks, wherein the media transmission side includes a plurality of first wireless modems and the media reception side includes at least one second wireless modem, and wherein the at least two wireless communications networks include a plurality of wireless data channels extending between and connecting the plurality of first wireless modems with the at least one second wireless modem, and some of the plurality of wireless data channels are associated with the first wireless network, while others of the plurality of wireless data channels are associated with the second wireless network, the network component including at least one processor configured to:

receive network-related information from one of the at least two wireless communications networks, wherein the network-related information includes information related to a handover of a modem associated with the first wireless network; and transmit the network-related information to the media transmission side in order to cause a redistribution of a plurality of data streams handled by at least some of the plurality of first wireless modems, wherein the redistribution of the plurality of data streams results in fewer network resources being allocated and used, and the media transmission transmitted over the plurality of wireless data channels comprises an aggregate of the plurality of data streams.

29. The device of claim 28, wherein the media reception side includes a plurality of second wireless modems, and the at least one processor is further configured to transmit the network-related information to the media reception side in order to adjust the receipt of the plurality of data streams at the plurality of second wireless modems.

30. The device of claim 28, wherein at least one of the first end node and the second end node is a smartphone.

31. The device of claim 28, wherein the first wireless network is a cellular network and the second wireless network is a wireless local area network (WLAN).

32. The device of claim 28, wherein the network component is configured to enable a determination to be made about managing network resources of one of the at least two wireless communications networks using performance-related information received from at least one of the first end node and the second end node.

* * * * *